United States Patent
Mori et al.

(10) Patent No.: US 7,083,136 B2
(45) Date of Patent: *Aug. 1, 2006

(54) WEBBING RETRACTOR

(75) Inventors: Shinji Mori, Aichi-ken (JP); Fuminori Komiya, Aichi-ken (JP); Teruhiko Koide, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 62 days.

This patent is subject to a terminal disclaimer.

(21) Appl. No.: 10/623,130

(22) Filed: Jul. 9, 2003

(65) Prior Publication Data

US 2004/0075009 A1 Apr. 22, 2004

(30) Foreign Application Priority Data

Jul. 11, 2002 (JP) ............................. 2002-202815

(51) Int. Cl.
 *B65H 75/48* (2006.01)
(52) U.S. Cl. .................. 242/390.8; 242/390.9
(58) Field of Classification Search ............. 242/390.8, 242/390.9
See application file for complete search history.

(56) References Cited

U.S. PATENT DOCUMENTS

| 4,423,846 | A |   | 1/1984 | Föhl |   |
|---|---|---|---|---|---|
| 4,750,685 | A |   | 6/1988 | Frei |   |
| 5,098,030 | A |   | 3/1992 | Kosugi |   |
| 5,529,258 | A |   | 6/1996 | Dybro et al. |   |
| 5,730,384 | A |   | 3/1998 | Föhl |   |
| 5,918,717 | A | * | 7/1999 | Fohl | 192/103 A |
| 6,364,236 | B1 | * | 4/2002 | Fohl | 242/374 |
| 6,626,388 | B1 |   | 9/2003 | Nagata et al. |   |
| 6,857,594 | B1 |   | 2/2005 | Mori et al. |   |
| 2003/0052209 | A1 |   | 3/2003 | Honl et al. |   |
| 2004/0075008 | A1 | * | 4/2004 | Mori et al. | 242/390.8 |
| 2004/0079828 | A1 | * | 4/2004 | Mori et al. | 242/390.8 |
| 2004/0108155 | A1 | * | 6/2004 | Mori et al. | 242/374 |

FOREIGN PATENT DOCUMENTS

| DE | 201 15 316 U1 | 3/2002 |
|---|---|---|
| EP | 1 195 536 A1 | 4/2002 |
| JP | 3-65455 | 3/1991 |

\* cited by examiner

*Primary Examiner*—Kathy Matecki
*Assistant Examiner*—Sang Kim
(74) *Attorney, Agent, or Firm*—Thomas W. Cole; Nixon Peabody LLP

(57) ABSTRACT

A mechanism of a webbing retractor which can instantaneously apply driving force of a motor to a spool. At a base plate of a prime mover which is driven to rotate, two pawls are disposed at opposing positions at an outer side of an adapter connected to a take-up shaft of a webbing. The adapter includes a plurality of external teeth being formed along a periphery thereof at uniform intervals, a total number of which is an odd number. Accordingly, in a state in which both of the pawls contact the adapter, even if one of the pawls abuts an addendum of a tooth formed at an outer peripheral surface of the adapter, the other pawl does not abut an addendum of a tooth. One of the pawls quickly meshes with the adapter and rotates the adapter.

22 Claims, 7 Drawing Sheets

F I G. 2
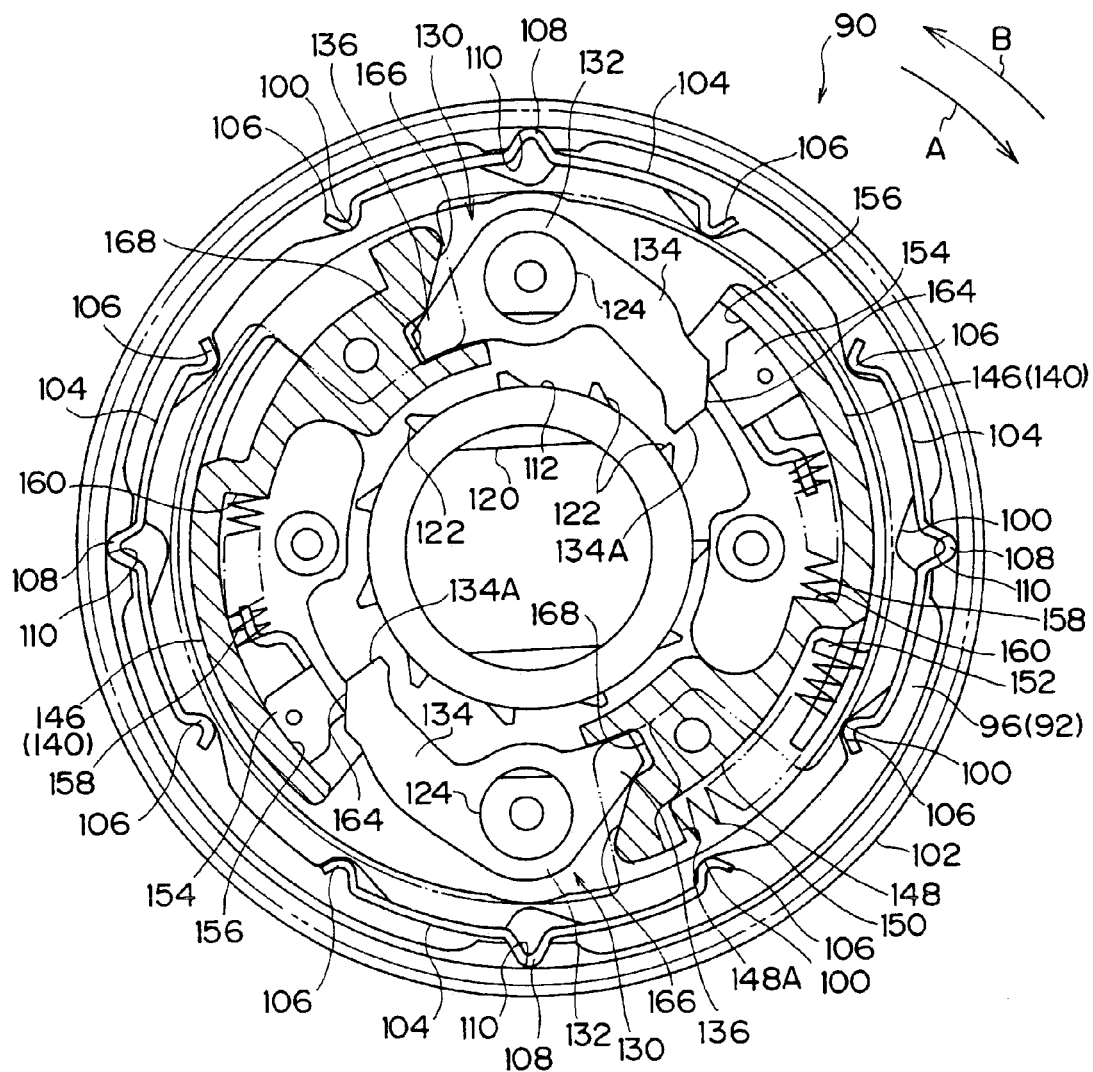

WEBBING RETRACTOR

CROSS-REFERENCE TO RELATED APPLICATION

This application claims priority under 35 USC 119 from Japanese patent Application No. 2002-202815, the disclosure of which is incorporated by reference herein.

BACKGROUND OF THE INVENTION

1. Field of the Invention

The present invention relates to a webbing retractor which structures a seat belt device of a vehicle or the like.

2. Description of the Related Art

A seat belt device which restrains, by an elongated, strip-shaped webbing belt, the body of a vehicle occupant who is seated in a seat of a vehicle, is equipped with a webbing retractor which is fixed to the vehicle body at the side of the seat. The webbing retractor has a spool (take-up shaft) whose axial direction runs, for example, substantially along the longitudinal direction of the vehicle. The proximal end side, in the longitudinal direction, of the webbing belt is anchored at the spool. The spool accommodates the webbing belt in a state in which the webbing belt is wound the form of a roll around the outer peripheral portion of the spool.

An urging member, such as a tension coil spring or the like which urges the spool in a take-up direction in which the spool takes up the webbing belt, is provided at the webbing retractor. Due to the urging force of this urging member, the webbing belt is taken up and accommodated. In the state in which the webbing belt is applied to the body of a vehicle occupant, slack or the like of the webbing belt is eliminated by the urging force of the urging member. In this type of webbing retractor, the webbing belt, which has been taken-up on the spool, is pulled out by a tongue plate, which is provided at the longitudinal direction intermediate portion of the webbing belt, being pulled against the urging force of the urging member. In this state, the webbing belt can be applied to a vehicle occupant by making the tongue plate be held at a buckle device provided at the side of the seat opposite the side at which the webbing retractor is provided.

On the other hand, in order to even more strongly restrain the body of a vehicle occupant at the time of a rapid deceleration of the vehicle or the like, a structure has been conceived of in which, at the time of a rapid deceleration of the vehicle or the like for example, the driving force of a motor is applied to the spool. Due to this driving force, the spool is rotated by a given amount in the direction of taking the webbing belt up, such that the tension of the webbing belt increases.

In this type of webbing retractor, when the spool and the driving shaft of the motor are mechanically connected at usual times, this impedes rotation of the spool during usual taking-up and pulling-out of the webbing belt, and an unnecessary load is applied to the motor. Thus, a clutch mechanism is provided between the driving shaft and the spool.

Various types of clutch mechanisms can be thought of. As one example, there is a centrifugal clutch mechanism having a driving-side gear which is directly or indirectly connected to the driving shaft; a spool-side gear which meshes with teeth formed at the spool; and a plurality of pawls which are pivotally supported at the driving-side gear so as to be able to swing at the radial direction side of the spool-side gear which is eccentric with respect to the axial center of the driving-side gear, and so as to be able to mesh with the spool-side gear due to this swinging.

In this type of centrifugal clutch mechanism, when the plurality of pawls swing due to centrifugal force at the time when the driving-side gear rotates due to driving force of the motor, the pawls mesh with the spool-side gear. The driving shaft of the motor and the spool are thereby mechanically connected.

In the above-described centrifugal clutch mechanism, in order for the driving shaft of the motor and the spool to be mechanically connected, the pawls must mesh with the spool-side gear. However, the pawls do not just merely swing, but also, must rotate together with the driving-side gear in order to receive centrifugal force. Accordingly, depending on the positions of the pawls at the time of swinging, the pawls do not always enter into the tooth spaces of the spool-side gear. For example, there is a possibility that the pawls will abut the addenda of the spool-side gear at the time of swinging.

In this way, in the state in which the pawls abut the addenda of the spool-side gear, the driving shaft of the motor and the spool are not mechanically connected until the pawls enter into the tooth spaces due to further rotation of the driving-side gear. Thus, in a case in which the pawls abut the addenda, time is required from the start of driving of the motor to the time when the spool is actually rotated. Therefore, there is still room for improvement.

SUMMARY OF THE INVENTION

In view of the aforementioned, an object of the present invention is to provide a webbing retractor which can quickly connect a motor and a take-up shaft so as to be able to apply driving force of the motor to a spool at an early stage.

A first aspect of the present invention is a webbing retractor for an elongated, strip-shaped webbing belt used for application to a body of a vehicle occupant, the webbing retractor comprising: a take-up shaft for taking the webbing belt up around itself, which take-up shaft is rotatably held, and to which one end of the webbing belt is anchored; an input gear connected to the take-up shaft, a plurality of teeth being formed along a periphery of the input gear at uniform intervals; a prime mover rotating body receiving driving force from a drive source, and rotating; and a plurality of connecting members for transmitting rotation of the prime mover rotating body to the input gear, which plurality connecting members rotate around the input gear interlockingly with the rotation of the prime mover rotating body, and each of which connecting members has a meshing portion that is capable of contacting and moving away from the input gear, and in a state in which at least one meshing portion contacts the input gear so as to engage with any of the teeth of the input gear, the rotation of the prime mover rotating body is transmitted to the input gear, wherein, in the state in which at least two of connecting members contact the input gear, a distance, along a direction of rotation of the input gear, between two meshing portions of the at least two of connecting members is substantially different than a number which is a integer multiple of a pitch of the plurality of teeth.

A second aspect of the present invention is a webbing retractor for an elongated, strip-shaped webbing belt used for application to a body of a vehicle occupant, the webbing retractor comprising: a take-up shaft for taking the webbing belt up around itself, which take-up shaft is rotatably held, and to which one end of the webbing belt is anchored; an input gear connected to the take-up shaft, a plurality of teeth being formed along a periphery of the input gear at uniform intervals; a prime mover rotating body receiving driving force from a drive source, and rotating; and a plurality of connecting members for transmitting rotation of the prime mover rotating body to the input gear, which plurality connecting members rotate around the input gear interlockingly with the rotation of the prime mover rotating body, and each of which connecting members has a meshing portion that is capable of contacting and moving away from the input gear, and in a state in which at least one meshing portion contacts the input gear so as to engage with any of the teeth of the input gear, the rotation of the prime mover rotating body is transmitted to the input gear, wherein relative positions of at least two of the connecting members are determined such that, when at least one of the meshing portions abuts an addendum of the tooth of the input gear, the meshing portion of at least another one of the connecting members abuts a portion of the input gear other than addenda of the input gear.

A third aspect of the present invention is a webbing retractor comprising: a take-up shaft, and a proximal end side of a webbing belt, which is elongated and strip-shaped and which restrains a body of a vehicle occupant by being applied to the body of the vehicle occupant, is anchored to the take-up shaft, and due to the take-up shaft rotating in a take-up direction which is one direction around an axis of the take-up shaft, the take-up shaft takes-up the webbing belt substantially in a form of a roll around an outer peripheral portion of the take-up shaft, and due to the webbing belt being pulled-out toward a distal end side of the webbing belt, the take-up shaft rotates in a pull-out direction which is opposite to the take-up direction; an input gear mechanically connected to the take-up shaft and rotating the take-up shaft by rotation of the input gear, a plurality of teeth being formed at uniform intervals around an axis of the input gear; a prime mover rotating body mechanically connected one of directly and indirectly to a drive source (mechanism), and receiving driving force from the drive source and rotating; and a plurality of connecting members which, interlockingly with rotation of the prime mover rotating body, rotate around the axis of the input gear, and the connecting members can, independently of this rotation, move so as to approach and move away from the teeth of the input gear, and due to the connecting members moving so as to approach the teeth, the connecting members mesh with the input gear and transmit the rotation of the prime mover rotating body to the input gear, and in a state in which the connecting members are meshed with the input gear, an interval between respective meshing portions around the axis of the input gear is an interval which is a sum of a number which is an integer multiple of a pitch of the plurality of teeth and a number which is less than the pitch.

In accordance with the webbing retractor having the above-described structure, the proximal end side of the webbing belt is anchored on the take-up shaft. When the webbing belt is not being used, the webbing belt is taken-up, from the proximal end side thereof, substantially in the form of a roll around the take-up shaft, and is accommodated thereat.

In this state, when the webbing belt is pulled toward the distal end side thereof, the webbing belt, which is wound on the take-up shaft, is pulled-out while the take-up shaft rotates in the pull-out direction.

Moreover, when the take-up shaft is rotated in the take-up direction in the state in which the webbing belt is pulled-out, the webbing belt is taken-up onto the take-up shaft from the proximal end side thereof, and is again accommodated on the webbing belt.

On the other hand, in the present webbing retractor, the prime mover rotating body is mechanically connected to the drive source (mechanism). When the drive source operates, the prime mover rotating body rotates due to the driving force of the drive source. Moreover, interlockingly with rotation of the prime mover rotating body, the plurality of connecting members rotate around the axial center of the input gear.

The input gear is mechanically connected to the take-up shaft. When the input gear rotates, the rotation of the input gear is transmitted to the take-up shaft, and the take-up shaft rotates in the take-up direction or the pull-out direction. Here, if none of the plurality of connecting members is meshing with the teeth of the input gear, the input gear does not rotate. Thus, the driving force of the drive source is not transmitted to the take-up shaft.

In contrast, in the state in which the prime mover rotating body is rotating, when at least one of the plurality of connecting members moves to approach the input gear and meshes with a tooth of the input gear, the connecting member, which rotates together with the prime mover rotating body, pushes the tooth of the input gear and rotates the input gear around the axial center thereof. In this way, the rotation of the input gear is transmitted to the take-up shaft, and the take-up shaft is rotated. In this way, in the webbing retractor of the present invention, the driving force of the drive source is transmitted to the take-up shaft.

Even if the connecting members approach the input gear, in a case in which the connecting members ride up on the addenda and do not enter in between the teeth of the input gear, a meshed state does not arise. The rotation of the prime mover rotating body is not transmitted to the take-up shaft via the connecting members and the input gear.

However, in the webbing retractor of the present invention, in the state in which the connecting members are meshed with the input gear, the interval between the meshing portions of the connecting members with respect to the input gear corresponds to the sum of a number which is an integer multiple of the pitch of the plural teeth of the input gear around the axial center of the input gear, and a number which is less than the pitch. Thus, for example, in a state in which any one of the plural connecting members rides up on the addendum of a tooth of the input gear, the other connecting member does not oppose the addendum of another tooth of the input gear, and the other connecting member can mesh with another tooth of the input gear. Thus, the driving force of the drive source can be reliably transmitted to the take-up shaft.

Moreover, in the webbing retractor of the present embodiment, the interval, around the axial center of the input gear in the state in which the plural connecting members have approached the input gear, is set as described above. Thus, all of the connecting members do not simultaneously mesh with the input gear. However, by setting the interval as described above, even if one of the connecting members cannot mesh with the input gear, another connecting member meshes with the input gear before the prime mover rotating body rotates by an amount corresponding to one pitch of the teeth of the input gear. In this way, the rotation of the prime mover rotating body can be transmitted to the take-up shaft at an early stage.

Any of the above-described aspects of the present invention may have the feature that the prime mover rotating body is structured so as to include a substantially ring-shaped external gear which is pivotally supported at the take-up shaft so as to be coaxial with the take-up shaft and so as to be able to rotate relative to the take-up shaft, and a plurality of external teeth are formed at an outer peripheral portion of the external gear at uniform intervals, and the external gear is connected one of directly and indirectly to a drive gear which rotates by driving force of the drive source, and the input gear is structured so as to include a shaft portion which is provided at an inner side of the external gear, and which is connected coaxially and integrally with the take-up shaft, and the teeth are formed at an outer peripheral portion of the shaft portion at predetermined intervals, and the external gear supports the connecting members such that the connecting members can move so as to approach and move away from the input gear, between the external gear and the input gear along a radial direction of the external gear.

In accordance with the webbing retractor having the above-described structure, the drive gear, which rotates due to the driving force of the drive source, is connected directly or indirectly to the external gear which forms the prime mover rotating body. The external gear is pivotally supported coaxially with the take-up shaft. Thus, when the drive gear rotates due to the driving force of the drive source, the rotation of the drive gear is transmitted to the external gear, and the external gear rotates around the axial center of the take-up shaft.

On the other hand, the shaft portion, which structures the input gear, is connected integrally and coaxially with the take-up shaft, at the inner side of the external gear which is formed in the shape of a ring. Moreover, between the external gear and the teeth formed at the outer peripheral portion of the input gear, the connecting members are supported at the external gear so as to be able to approach and move away from the input gear.

Accordingly, if the connecting members are not meshing with the input gear in the state in which the external gear is rotating, the external gear rotates relative to the take-up shaft. If the connecting members are meshed with the input gear in the state in which the external gear is rotating, the external gear and the take-up shaft rotate integrally.

Here, in the present webbing retractor, as described above, the input gear and the connecting members are disposed at the inner side of the external gear. Thus, basically, the respective members which are the external gear, the input gear, and the connecting members all fit within the size of the external gear. In this way, the clutch mechanism for connecting and disconnecting the take-up shaft and drive source can be made compact.

Any of the aspects of the present invention may have the feature that the connecting members move so as to approach the input gear and mesh with the input gear in a case in which the prime mover rotating body rotates in a direction of rotating the take-up shaft in the take-up direction in a state in which the connecting members mesh with the input gear.

In accordance with the webbing retractor having the above-described structure, the prime mover rotating body rotates due to the driving force of the drive source. In this state, if the connecting members are meshing with the input gear, the rotation of the prime mover rotating body is transmitted to the input gear via the connecting members, and the take-up shaft thereby rotates.

In the present webbing retractor, when the rotation of the prime mover rotating body is rotation in the take-up direction of the take-up shaft, the connecting members mesh with the input gear. (Hereinafter, for convenience of explanation, the direction of rotation of the prime mover rotating body in this case also will be called the "take-up direction".)

Thus, when only the input gear of the take-up shaft rotates, or when the prime mover rotating body rotates in the direction opposite to the take-up direction, the connecting members do not mesh with the input gear, and the input gear or the prime mover rotating body rotates idly. Namely, in the present webbing retractor, basically, the driving force of the drive source contributes only to taking-up of the webbing belt.

Accordingly, for example, when the drive source is driven in a state in which the webbing belt is applied to a vehicle occupant, the webbing belt is taken-up onto the take-up shaft, looseness (so-called "slack") in the webbing belt is eliminated, and the force by which the webbing belt restrains the body of the vehicle occupant improves.

The webbing retractor in accordance with any one of the above-described aspects of the present invention may further have the control unit which controls and drives the drive source. At least one detector among a deceleration detector and an obstacle detector (a forward observation device) is connected to the control unit.

A deceleration detection signal is outputted from the deceleration detector when the rate of change in deceleration at the time the vehicle decelerates (i.e., the deceleration) is greater than or equal to a predetermined value. On the other hand, an obstacle detection signal is outputted from the obstacle detector when the distance to an obstacle positioned ahead of the vehicle is less than a predetermined value.

The deceleration detection signal or the obstacle detection signal is inputted to the control unit. When such a detection signal is inputted to the control unit, the control unit drives the drive source. The driving force of the drive source is transmitted to the take-up shaft via the prime mover rotating body, the connecting members and the input gear. In this way, the take-up shaft rotates in the take-up direction.

In this way, in the present webbing retractor, when at least one of a state of rapid deceleration of the vehicle and a state immediately before colliding with an obstacle in front of the vehicle and the like arises, the take-up shaft is rotated in the take-up direction, and the webbing belt is taken-up on the take-up shaft. In this way, the force by which the webbing belt restrains the body of the vehicle occupant improves. Due to a state such as those described above arising, the body of the vehicle occupant, which attempts to move substantially toward the front of the vehicle, can be held reliably.

BRIEF DESCRIPTION OF THE DRAWINGS

FIG. 2 is a plan view of the clutch mechanism relating to the embodiment of the present invention.

FIG. 7A shows a state in which frictional force is not being applied and FIG. 7B shows a state in which frictional force is being applied.

DETAILED DESCRIPTION OF THE INVENTION

Figure 1:
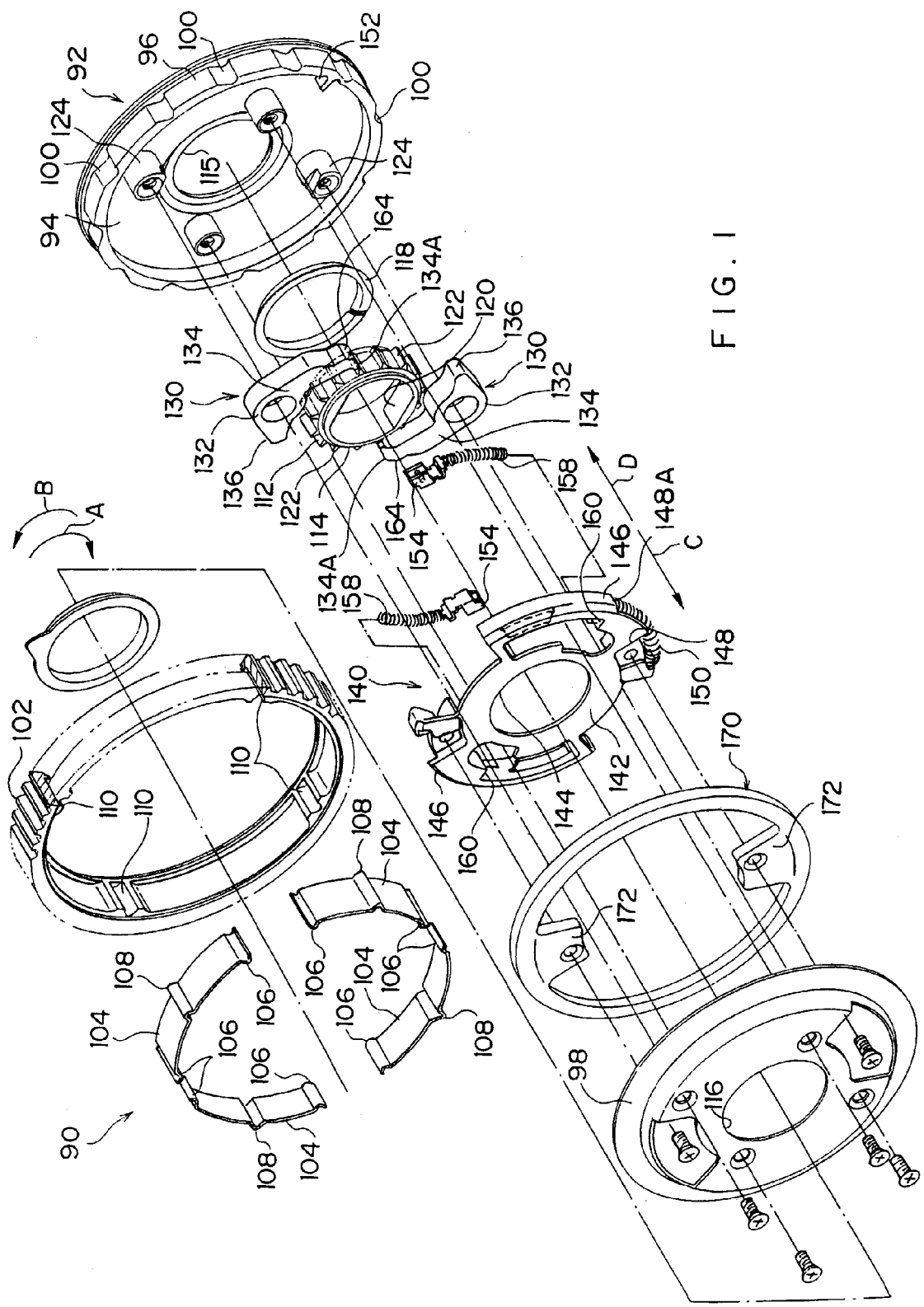
FIG. 1 is an exploded perspective view showing the structure of a clutch mechanism relating to an embodiment of the present invention.

In one embodiment of the webbing retractor of the present invention, when the prime mover rotating body is driven and rotated at greater than a predetermined speed, the plurality of connecting members are moved such that the meshing portions contact the input gear. The input gear has an odd number of teeth, and at least two of the meshing portions are disposed so as to be positioned so as to oppose one another across the input gear, at an outer side of the input gear. The prime mover rotating body is pivotally supported so as to be coaxial with the input gear and so as to be able to rotate relative to the input gear. The plurality of connecting members are held at the prime mover rotating body so as to be rotatable, and when the prime mover rotating body is driven and rotated at greater than a predetermined speed, the plurality of connecting members rotate in a direction of contacting the input gear.

The webbing retractor further comprises a rotating disc body which is held so as to be coaxial with the prime mover rotating body and so as to be able to rotate relative to the prime mover rotating body, and the rotating disc body has a mechanism which, when the prime mover rotating body is driven and rotated at greater than a predetermined speed, rotates relative to the prime mover rotating body and rotates the plurality of connecting members in a direction of contacting the input gear. The webbing retractor further comprises a braking mechanism, and when the prime mover rotating body is driven and rotated at greater than a predetermined speed, the braking mechanism brakes the rotating disc body and causes relative rotation of the rotating disc body.

The prime mover rotating body has an external gear which is ring-shaped, is connected to the drive source, and has external teeth for enabling the external gear to be rotated; a base portion which has a holding portion for holding the plurality of connecting members, and which is pivotally supported so as to be coaxial with the input gear and so as to be able to rotate relative to the input gear; and at least one torque limiter which is provided between the external gear and the base portion, so as to be able to transmit torque of a predetermined range from the external gear to the base portion.

The webbing retractor further comprises a control unit controlling operation of the drive source, and when a rate of change in deceleration at a time when a vehicle decelerates is greater than or equal to a predetermined value, the control unit effects control so as to cause the drive source to operate.

Moreover, the webbing retractor further comprises a control unit controlling operation of the drive source, and when a distance to an obstacle which is positioned ahead of a vehicle is less than a predetermined value, the control unit effects control so as to cause the drive source to operate.

Hereinafter, an embodiment of the present invention will be described in detail with reference to the drawings.

STRUCTURE OF THE EMBODIMENT (Overall Structure of Webbing Retractor 10)

Figure 5:
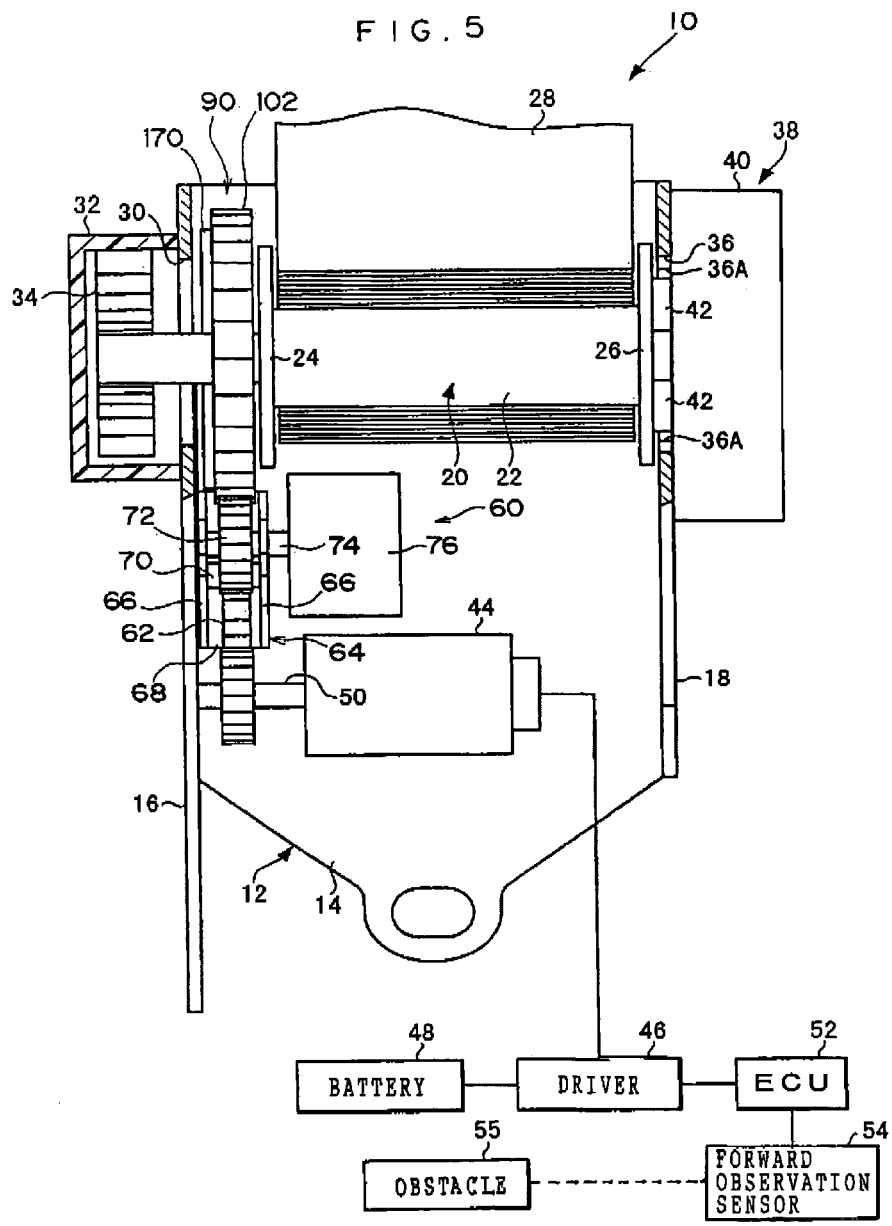
FIG. 5 is a front view showing the basics of the structure of a webbing retractor relating to the embodiment of the present invention.

A front view showing the overall structure of a webbing retractor 10 relating to the embodiment of the present invention is shown in FIG. 5. As shown in FIG. 5, the webbing retractor 10 has a frame 12. The frame 12 has a back plate 14 which is substantially plate-shaped. The webbing retractor 10 is mounted to a vehicle body by the back plate 14 being fixed to the vehicle body by unillustrated fasteners such as bolts or the like. A pair of leg plates 16, 18 extend parallel to one another from the transverse direction ends of the back plate 14. A spool 20, which serves as a take-up shaft or a driven shaft and which is manufactured by die casting or the like, is disposed rotatably between the leg plates 16, 18.

The spool 20 is structured by a spool main body 22 and a pair of flange portions 24, 26, and is formed in a drum-shape on the whole. The spool main body 22 is substantially hollow cylindrical. The pair of flanges 24, 26 are formed in substantial disc shapes at the end portions of the spool main body 22.

The proximal end portion of a webbing belt 28, which is formed in the shape of an elongated strip, is fixed to the spool main body 22 between the flange portions 24, 26. When the spool 20 is rotated in one direction around the axis thereof, the webbing belt 28 is taken-up in the form of a roll onto the outer peripheral portion of the spool main body 22 from the proximal end side of the webbing belt 28. Further, if the webbing belt 28 is pulled from the distal end side thereof, the webbing belt 28, which is taken-up on the outer peripheral portion of the spool main body 22, is pulled-out. Accompanying this, the spool 20 rotates opposite to the direction of rotation at the time of taking-up the webbing belt 28. (Hereinafter, for convenience of explanation, the direction of rotation at the time of taking-up the webbing belt 28 will be called the "take-up direction", and the direction of rotation of the spool 20 at the time when the webbing belt 28 is pulled out will be called the "pull-out direction".)

The flange portion 24 one end side of the spool 20, which is at the side opposite the flange portion 26 side of the spool 20, passes substantially coaxially through a circular hole 30 which is formed in the leg plate 16, and projects to the exterior of the frame 12. A case 32 is disposed at the outer side of the frame 12 at the leg plate 16 side. The case 32 is disposed so as to oppose the leg plate 16 along the axial direction of the spool 20, and is fixed to the leg plate 16. The case 32 is, on the whole, open toward the leg plate 16 side. The one end side of the spool 20 which passes through the circular hole 30 enters into the inner side of the case 32, and is rotatably supported by the case 32.

Moreover, a spiral spring 34 is disposed at the interior of the case 32. The end portion, at the outer side in the direction of the spiral, of the spiral spring 34 is anchored on the case 32. The end portion, at the inner side in the direction of the spiral, of the spiral spring 34 is anchored on the spool 20. When the spool 20 is rotated in the pull-out direction from a neutral state in which no particular load is applied, urging force in the take-up direction arises, and the spiral spring 34 urges the spool 20 in the take-up direction. Accordingly, when the tensile force applied to the webbing belt 28 for pulling the webbing belt 28 out from the spool 20 is released, the urging force of the spiral spring 34 rotates the spool 20 in the take-up direction, and the webbing belt 28 is taken-up onto the spool 20.

On the other hand, the flange portion 26 side other end side of the spool 20, which is opposite the flange portion 24 side thereof, passes substantially coaxially through an internal teeth ratchet hole 36 formed in the leg plate 18, and projects at the exterior of the frame 12. A lock mechanism 38 is provided at the outer side of the frame 12 at the leg plate 18 side. The lock mechanism 38 has a case 40. The case 40 is disposed so as to oppose the leg plate 18 along the axial direction of the spool 20, and is fixed to the leg plate 18. Respective members forming the lock mechanism 38, such as an inertial plate or an external gear, an acceleration sensor, and the like (all of which are unillustrated), are accommodated at the inner side of the case 40. Due to the spool 20 rotating suddenly in the take-up direction, the inertial plate within the case 40 rotates relative to the spool 20, or the acceleration sensor detects a state of rapid deceleration of the vehicle and the inertial plate within the case 40 is forcibly rotated relative to the spool 20.

A pair of lock plates 42 are provided at the inner side of the ratchet hole 36. The lock plates 42 are supported by a lock base which is provided within the case 40 and rotates integrally with the spool 20. When the inertial plate within the case 40 rotates in the pull-out direction relative to the lock base, the lock plates 42 are guided by guide portions formed at the lock base, and approach the inner peripheral portion of the ratchet hole 36. External teeth formed at the lock plates 42 mesh with the internal teeth formed at the inner peripheral portion of the ratchet hole 36. Due to the external teeth formed at the lock plates 42 meshing with the internal teeth formed at the inner peripheral portion of the ratchet hole 36 in this way, rotation of the lock base in the pull-out direction is restricted, and accordingly, rotation of the spool 20 is restricted.

On the other hand, a motor 44 serving as a drive source is disposed beneath the spool 20 between the leg plate 16 and the leg plate 18. The motor 44 is electrically connected via a driver 46 to a battery 48 mounted in the vehicle. Due to current from the battery 48 flowing to the motor 44 via the driver 46, the motor 44 rotates an output shaft 50 in the forward direction or the reverse direction.

The driver 46 is connected to an ECU 52 formed by a microcomputer or the like. The ECU 52 is connected to a forward observation sensor 54 which structures a detector and serves as a forward observation device. The forward observation sensor 54 is provided in a vicinity of the front end portion of the vehicle, and emits infrared rays toward the region in front of the vehicle, and receives the infrared rays which have been reflected by another vehicle or an obstacle 55 which has stopped or is traveling in front of the vehicle. (Hereinafter, such objects, including vehicles which are traveling or have stopped, will be called "obstacles" for convenience of explanation.) The ECU 52 computes the distance to the obstacle 55 ahead on the basis of the time required for the forward observation sensor 54 to receive light from the tune the forward observation sensor 54 emitted the infrared rays.

On the basis of an electrical signal outputted from the forward observation sensor 54, the ECU 52 operates the driver 46 and controls the motor 44.

(Structure of Braking Mechanism 60)

Figure 6:
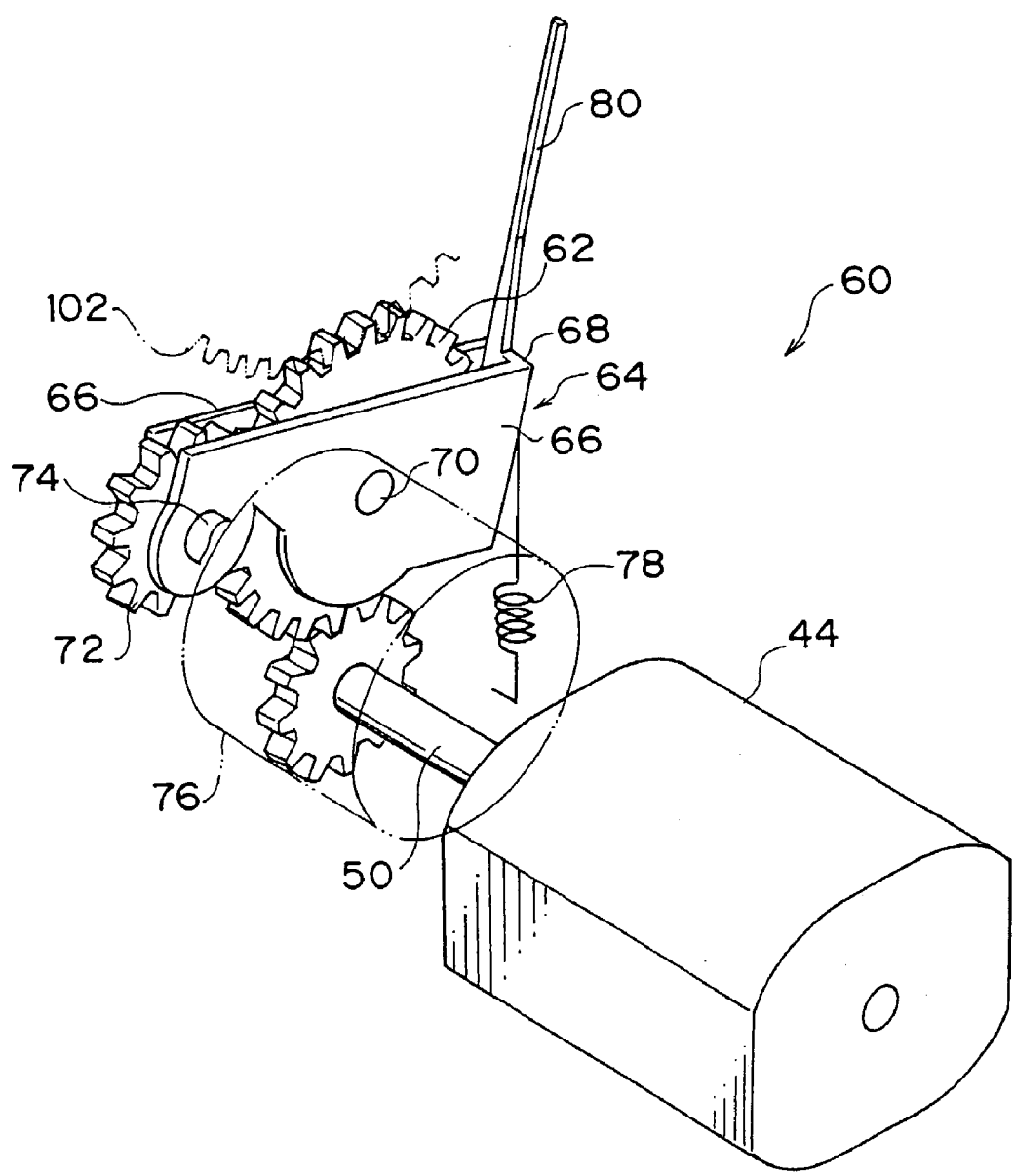
FIG. 6 is a perspective view showing the basics of the structure of a braking mechanism of the webbing retractor relating to the embodiment of the present invention.

On the other hand, a gear 56 is provided coaxially and integrally with the distal end portion of the output shaft 50 of the motor 44. The gear 56 meshes with a gear 62 which has external teeth and forms a braking mechanism 60. As shown in FIGS. 5 and 6, the braking mechanism 60 has a frame 64. The frame 64 has a pair of side walls 66 which are parallel to and oppose the leg plates 16, 18 of the frame 12. The side walls 66 are connected integrally to the rear surface side of the frame 12 by a back wall 68. On the whole, the frame 64 is formed, in plan view, in a substantially concave shape which opens toward the front surface side of the frame 12. The gear 62 is provided such that the center of rotation thereof is positioned between the side walls 66, and is rotatably supported by a shaft 70 which passes through the side walls 66 and is supported at the leg plate 16 of the frame 12.

The gear 62 has a larger diameter than and more teeth than the gear 56. Accordingly, the rotation of the gear 56 is decelerated by being transmitted to the gear 62. Moreover, a gear 72 is disposed at the side of the gear 62 opposite the side at which the back wall 68 of the frame 64 is provided.

The gear 72 meshes with the gear 62 in a state in which the gear 72 is rotatably supported by a shaft 74 whose both ends are supported at the side walls 66. Accordingly, the gear 72 can rotate around the gear 62 due to the rotation of the gear 62 being transmitted thereto. Moreover, the shaft 74 which pivotally supports the gear 72 extends to the interior of the frame 12. A weight 76, which is formed in the shape of a solid cylinder and which is substantially coaxial with the shaft 74, is fixed integrally to this distal end portion of the shaft 74. The weight 76 is integral with the gear 72 via the shaft 74. The self-weight of the gear 72 and the weight of the weight 76 are applied to the gear 72.

On the other hand, as shown in FIG. 6, one end of a tension coil spring 78 is anchored on the back plate 68 of the frame 64. The other end of the tension coil spring 78 is fixed to the leg plate 16 at a position which is lower than the one end of the tension coil spring 78. The urging force of the tension coil spring 78 is greater than the gravity based on the weight of the weight 76 and the self-weight of the gear 72 which are applied to the gear 72. The urging force is applied such that the rear wall 68 side of the frame 64 is pulled downward against the gravity applied to the gear 72.

Figure 7A:
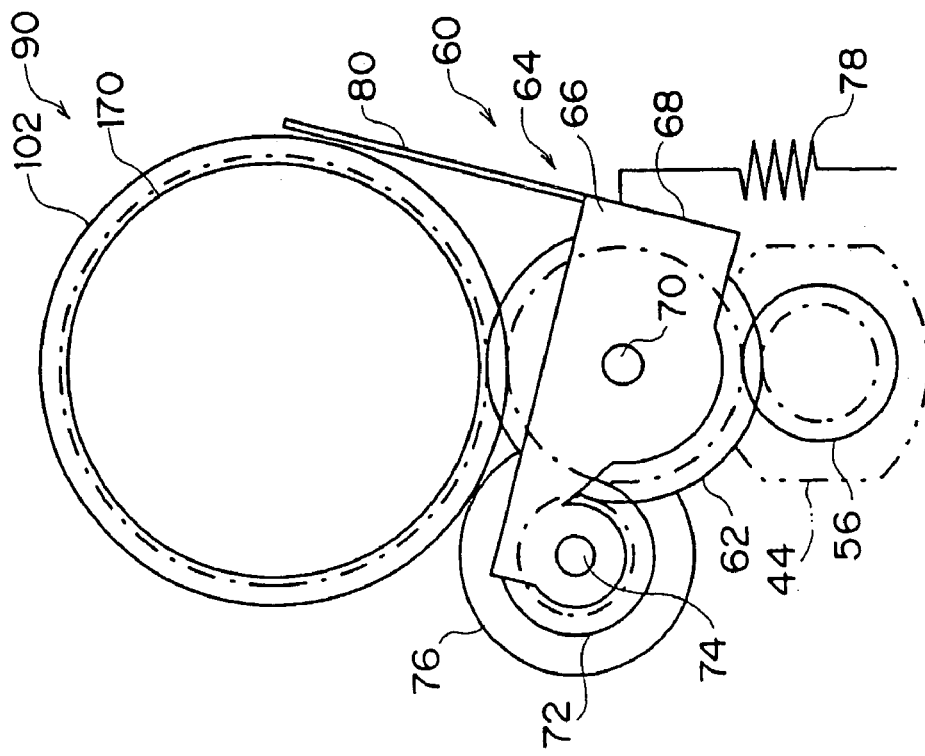
FIGS. 7A and 7B are side views showing the basics of the structure of the braking mechanism of the webbing retractor relating to the embodiment of the present invention, where
Figure 7B:
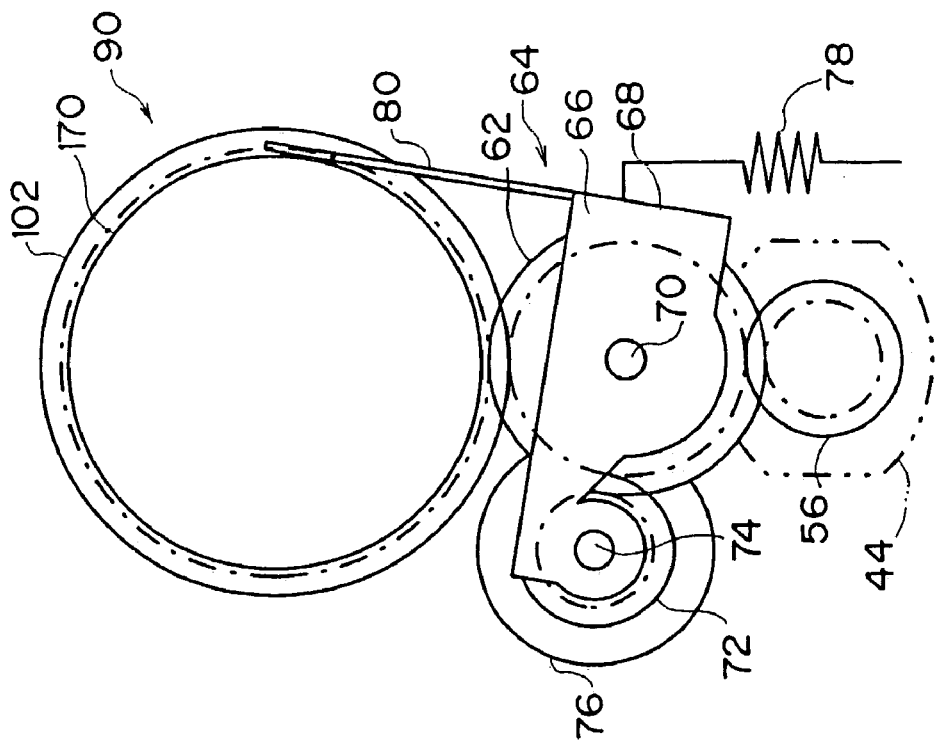

Further, as shown in FIGS. 6 and 7A, a braking piece 80, which is shaped as a plate having a narrow width, extends from the top end portion of the rear wall 68. As shown in FIG. 7B, the braking piece 80 restricts rotation of a friction ring 170 due to friction at the time when the braking piece 80 abuts the outer peripheral portion of the friction ring 170 of a clutch 90 which will be described hereinafter.

(Structure of Clutch 90)

Figure 3:
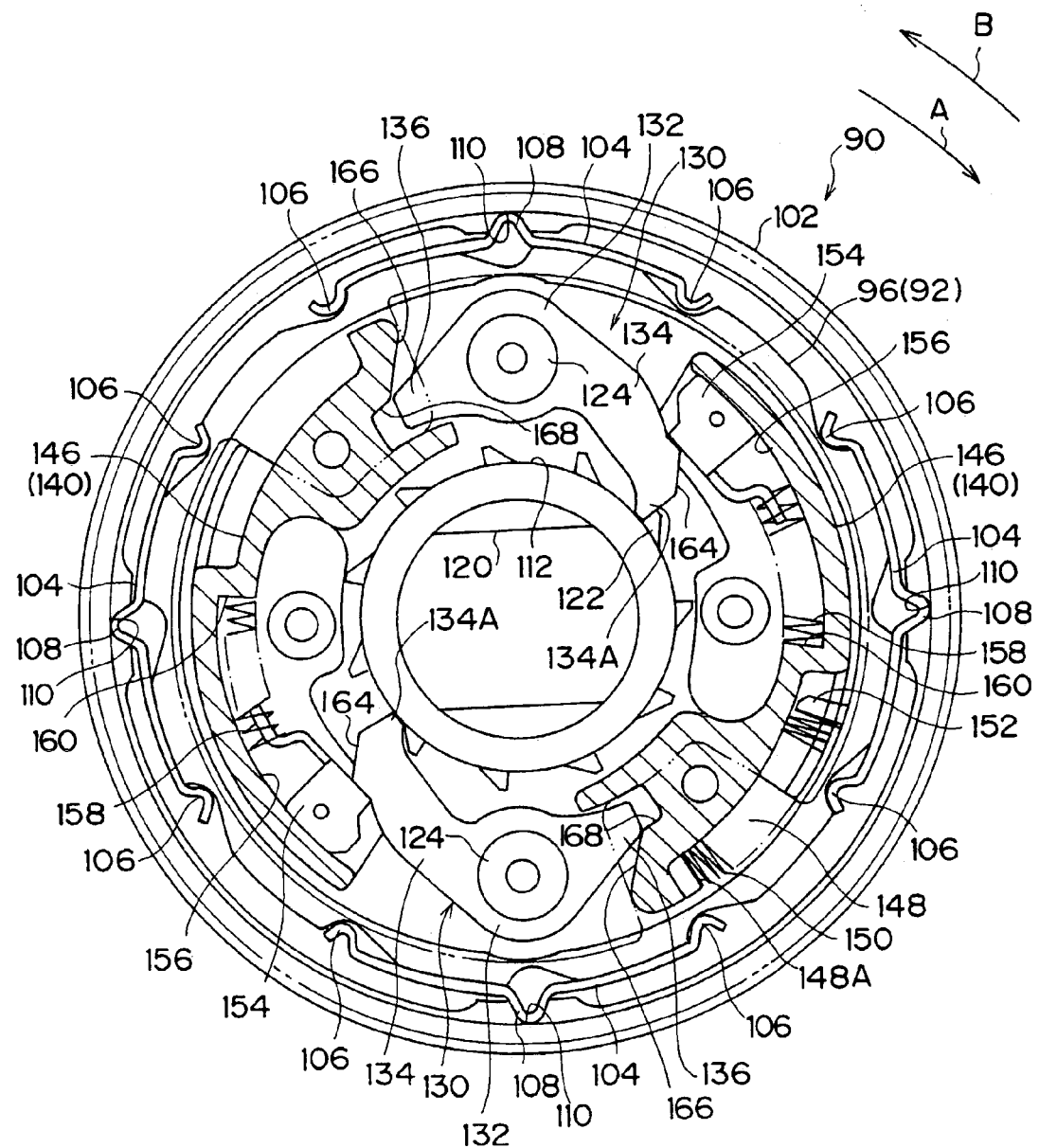
FIG. 3 is a plan view of the clutch mechanism, and shows a state in which connecting members are meshing with an input gear.
Figure 4:
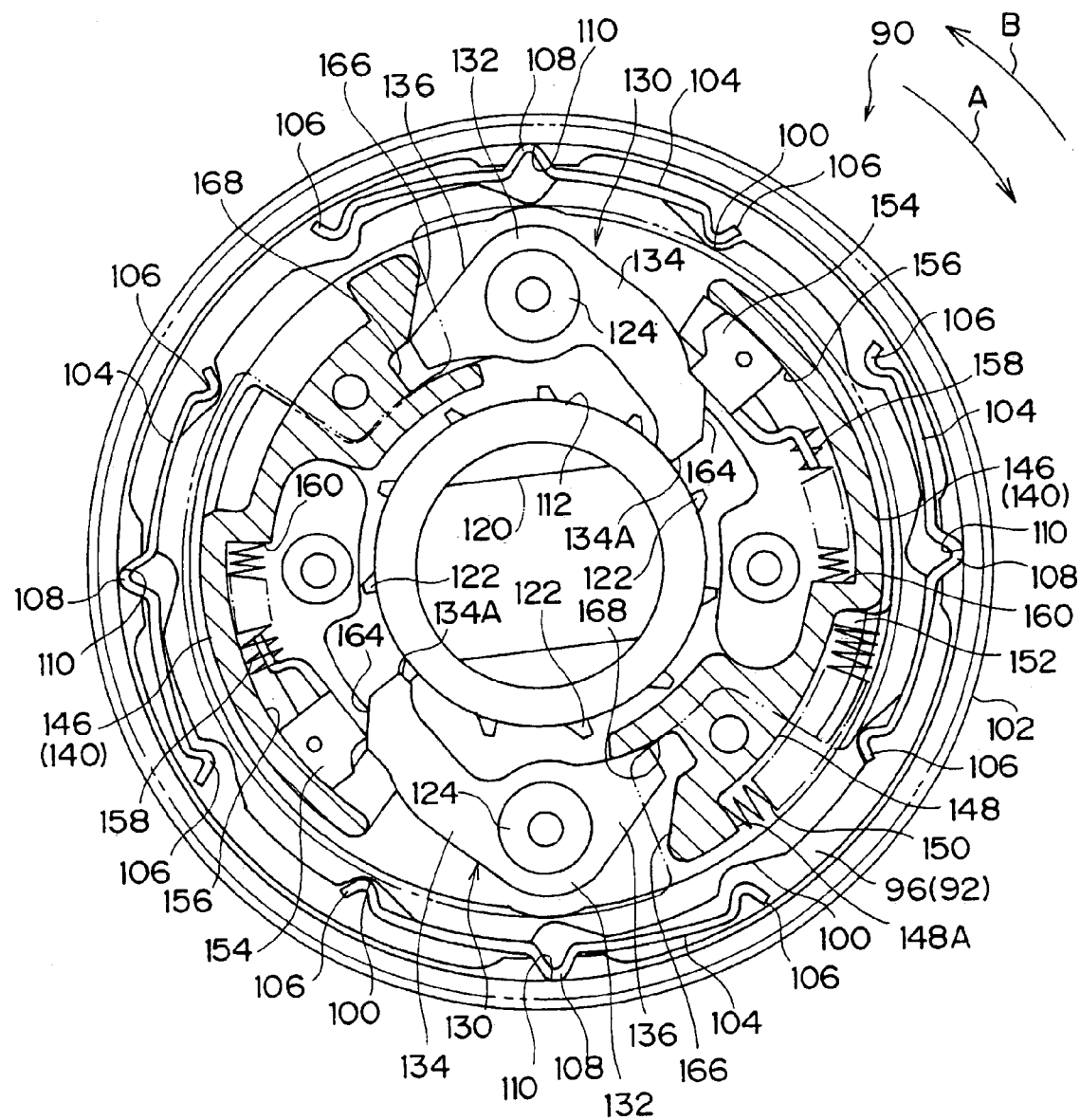
FIG. 4 is a plan view of the clutch mechanism, and shows a state in which one of the connecting members is abutting an addendum of the input gear.

On the other hand, as shown in FIG. 4, the clutch 90 is provided at the radial direction side of the gear 62. Hereinafter, the clutch 90 will be described with reference to FIGS. 1 through 4.

As shown in FIGS. 1 through 4, the clutch 90 has a base plate 92. The base plate 92 is formed in the shape of a hollow cylinder which has a bottom and whose axial direction dimension is extremely short (or in the shape of a shallow tray). A substantially ring-shaped peripheral wall 96 is formed along the outer peripheral portion of a disc-shaped base portion 94 of the base plate 92. A cover 98, which is disc-shaped, is attached to the open end at one axial direction end side of the base plate 92 (the arrow C direction side in FIG. 1), such that the open end of the base plate 92 is basically closed.

Engaging recesses 100 are formed at uniform intervals along the peripheral direction in the outer peripheral portion of the peripheral wall 96. An external gear 102, which is substantially ring-shaped and structures a prime mover rotating body, is provided at the outer side of the peripheral wall 96, coaxially with the base plate 92. The inner diameter dimension of the external gear 102 is sufficiently larger than the outer diameter dimension of the peripheral wall 96. The number of teeth of the external gear 102 is sufficiently greater than that of the gear 62. An annular gap is formed between the inner peripheral portion of the external gear 102 and the outer peripheral portion of the peripheral wall 96. A plurality of torque limiters 104 are disposed intermittently in the peripheral direction in this annular gap.

The torque limiters 104 are plate-shaped metal pieces having thin widths and having a spring property. Engaging portions 106, which can enter into the aforementioned engaging recesses 100, are formed at the both longitudinal direction end portions of each of the torque limiters 104. Further, an engaging projection 108, which is bent as if to project out in a direction substantially opposite to the projecting direction of the engaging portions 106, is formed substantially at the longitudinal direction center of each of the torque limiters 104.

Engaging recesses 110 are formed at the inner peripheral portion of the external gear 102 in correspondence with the engaging projections 108. Due to the engaging portions 106 entering into the engaging recesses 100 in the state in which the engaging projections 108 are in the engaging recesses 110, the base plate 92 and the external gear 102 are connected substantially integrally via the torque limiters 104. In this way, when the external gear 102 attempts to rotate relative to the base plate 92 around the axis of the base plate 92, the torque limiters 104 also of course attempt to rotate integrally together with the external gear 102.

However, due to the engaging portions 106 of the torque limiters 104 being in the engaging recesses 100, when the engaging portions 106 attempt to rotate along the peripheral direction of the peripheral wall 96, the engaging recesses 100 engage (interfere with) the engaging portions 106 such that rotation of the engaging portions 106 is restricted. In this way, relative rotation of the external gear 102 with respect to the base plate 92 is restricted, and the external gear 102 and the base plate 92 are mechanically connected.

However, as described above, because the torque limiters 104 are metal pieces having a spring property, if the torque generated by the relative rotation of the external gear 102 with respect to the base plate 92 is large enough to pull the engaging portions 106 out from the engaging recesses 100 against the spring force (urging force) of the torque limiters 104, the engagement (interference) of the engaging recesses 100 with the engaging portions 106 is released. Therefore, relative rotation of the external gear 102 with respect to the base plate 92 becomes possible.

On the other hand, an adapter 112, which is substantially hollow cylindrical and structures an input gear and serves as a shaft portion, is disposed substantially coaxially with the base plate 92 at the inner side of the base plate 92. On the whole, the axial direction one end (the arrow D direction side in FIG. 1) of the adapter 112 is pivotally supported at a circular hole 115 formed in the center of the base portion 94 (the base plate 92). A tubular portion 114, which is hollow cylindrical and is formed coaxially at the other end of the adapter 112, is pivotally supported at a circular hole 116 formed in the cover 98.

A spacer 118, which is formed in a ring shape and of a synthetic resin material, is disposed between the adapter 112 and the base portion 94 of the base plate 92. The spacer 118 is pivotally supported by the tubular portion 114 of the adapter 112. One axial direction end surface of the spacer 118 abuts the base portion 94, whereas the other axial direction end surface abuts the end surface of the connecting portion where the main body portion of the adapter 112 is connected to the tubular portion 114.

A fit-together hole 120, which passes through along the axial direction of the adapter 112, is formed in the adapter 112. The other axial direction end of the spool 20 is fit into the fit-together hole 120, such that the adapter 112 and the spool 20 are connected together coaxially and integrally.

Further, a plurality of external teeth 122 (teeth of the input gear), which is an odd number of teeth, are formed at uniform intervals at the outer peripheral portion of the adapter 112.

Moreover, a pair of bosses 124 are formed at the base portion 94 of the base plate. 92 at the radial direction outer side of the adapter 112. Each boss 124 is formed as a substantially hollow cylinder, and stands erect from the base portion 94 toward one side in the axial direction thereof. These bosses 124 are formed so as to oppose one another across the circular hole 115. A pawl 130 serving as a connecting member is provided at each boss 124.

The pawl 130 has a main body 132. The main body 132 is formed in the shape of a ring whose inner diameter dimension is extremely slightly larger than the outer diameter dimension of the boss 124. Due to the main body 132 being fit together with the boss 124 such that the boss 124 passes through the main body 132, the pawl 130 is pivotally supported so as to be freely rotatable around the boss 124. A connecting piece 134 is formed at a portion of the outer periphery of the main body 132.

The connecting piece 134 is formed so as to extend, with respect to the main body 132, toward the spool 20 take-up direction (shown by arrow A in FIGS. 1 through 4) side, in the state in which the main body 132 is pivotally supported at the boss 124. Moreover, the connecting piece 134 is formed such that, due to the main body 132 rotating over a predetermined angle in the take-up direction around the boss 124, a distal end 134A abuts the outer peripheral portion of the adapter 112 between the external tooth 122 and the external tooth 122 of the adapter 112. The distal end 134A of the connecting piece 134 is formed as an inclined surface which is inclined so as to correspond to the pull-out direction (shown by arrow B in FIGS. 1 through 4) side surfaces of the external teeth 122. Due to the distal end 134A abutting and interfering with the external tooth 122, rotation of the adapter 112 in the pull-out direction is restricted.

Here, as described above, the bosses 124 are formed so as to oppose one another across the circular hole 115. Therefore, in a state in which the corner portions of the distal ends 134A of the pawls 130 which have basically the same configurations contact the outer peripheral surface of the adapter 112, the distal end 134A of one of the pawls 130 is positioned, across the axial center of the adapter 112, at the opposite side of the distal end 134A of the other of the pawls 130. Accordingly, if the total number of external teeth 122 formed at the outer peripheral portion of the adapter 112 is an even number and the external tooth 122 is formed at the opposite side, across the axial center of the adapter 112, of any of the external teeth 122, the distal ends 134A of the both pawls 130 both abut the external teeth 122.

However, as mentioned above, in the present embodiment, the total number of the external teeth 122 formed at the outer peripheral portion of the adapter 112 is an odd number (see FIG. 3). Thus, in the state in which the distal end 134A of the one pawl 130 is abutting the external tooth 122, the distal end 134A of the other pawl 130 has moved apart from the external tooth 122 along the peripheral direction of the adapter 112 (i.e., the distal end 134A of the other connecting piece 134 is not contacting the external tooth 122).

On the other hand, as shown in FIGS. 1 through 4, a releasing piece 136 extends from the outer peripheral portion of the main body 132. The releasing piece 136 is formed at the side of the main body 132 approximately opposite the side at which the connecting piece 134 is formed. The outer side surface of the releasing piece 136 is an inclined surface which is directed toward the outer side in the radial direction of the base plate 92 along (with respect to) the pull-out direction. By rotating the releasing piece 136 in the pull-out direction, the connecting piece 134 rotates in the direction of moving away from the outer peripheral portion of the adapter 112.

Further, the clutch 90 is provided with a rotating plate 140. The rotating plate 140 has a substantially plate-shaped base portion 142 whose direction of thickness runs along the axial directions of the base plate 92 and the adapter 112. A circular hole 144 is formed in the base portion 142. The inner diameter dimension of the circular hole 144 is formed to be extremely slightly larger than the outer diameter dimension of the tubular portion 114 formed coaxially with respect to the outer peripheral portion of the adapter 112 at the axial direction other end side of the adapter 112. By carrying out assembly by making the tubular portion 114 pass through the circular hole 144, the base portion 142, and thus, the rotating plate 140 are pivotally supported at the adapter 112 so as to freely rotate around the adapter 112.

Further, a pair of blocks 146 are formed at the base portion 94 side surface of the base portion 142. The blocks 146 are formed so as to oppose one another across the circular hole 144 (i.e., with the circular hole 144 positioned therebetween). One of the bosses 124 is positioned at one of the regions, along the outer periphery of the outer side of the circular hole 144, between the pair of blocks 146. The other boss 124 is positioned at the other of these regions, which is positioned at the side of the circular hole 144 opposite the side at which the aforementioned one of the regions is provided.

A spring accommodating portion 148 is formed at the outer peripheral portion of one of the pair of blocks 146 (the outer side surface of the block 146 which outer side surface runs along the peripheral direction of the circular hole 144). A compression coil spring 150 is accommodated in the spring accommodating portion 148.

The compression coil spring 150 is accommodated in the spring accommodating portion 148 in a state in which the compression coil spring 150 bends around the center of the circular hole 144. The take-up direction side end portion of the compression coil spring 150 abuts a wall portion 148A of the spring accommodating portion 148. The pull-out direction side end portion of the compression coil spring 150 abuts an abutment wall 152 which extends from the inner peripheral portion of the peripheral wall 96 of the base plate 92 and which enters into the spring accommodating portion 148.

The rotating plate 140 is pivotally supported at the tubular portion 114 of the adapter 112. Therefore, basically, the rotating plate 140 freely rotates relative to not only the adapter 112 but to the base plate 92 as well. However, as described above, the take-up direction side end portion of the compression coil spring 150 abuts the wall portion 148A of the spring accommodating portion 148, and the pull-out direction side end portion of the compression coil spring 150 abuts the abutment wall 152 of the base plate 92. Therefore, when the base plate 92 attempts to rotate in the take-up direction relative to the rotating plate 140, the abutment wall 152 pushes the rotating plate 140 in the take-up direction via the compression coil spring 150, and makes the rotating plate 140 rotate following the rotation of the base plate 92.

Therefore, provided that torque, which is of a magnitude which can resist the urging force of the compression coil spring 150, is not applied to the rotating plate 140, rotation of the base plate 92 in the take-up direction relative to the rotating plate 140 is limited.

Moreover, a pressing piece 154, which serves as a forcibly connecting mechanism, is provided at the inner peripheral portion of each block 146. These pressing pieces 154 are disposed at the take-up direction sides of the pawls 130, and can move relative to the blocks 146 (i.e., relative to the rotating plate 140) along peripheral walls 156 formed at the blocks 146 so as to curve coaxially with respect to the circular hole 144.

Further, compression coil springs 158 serving as urging members are provided at the sides of the pressing pieces 154 opposite the sides at which the pawls 130 are provided. The compression coil springs 158 are disposed in states of being curved along the peripheral walls 156. One end of the compression coil spring 158 is anchored at and connected to the end portion of the pushing piece 154 at the side opposite the side where the pawl 130 is provided. In contrast, the other end of the compression coil spring 158 abuts an abutment wall 160 which is formed at the rotating plate 140 at the side opposite the pushing piece 154.

Inclined surfaces 164 are formed at the transverse direction outer ends of the connecting pieces 134 of the pawls 130, in correspondence with the respective pushing pieces 154. The inclined surface 164 is inclined outwardly in the radial direction of the base plate 92 so as to face in (i.e., with respect to) the take-up direction. In the state in which the distal end 134A does not contact the outer peripheral portion of the adapter 112, the inclined surface 164 opposes the pushing piece 154 along the peripheral direction of the base plate 92 and the rotating plate 140.

The pushing piece 154 is formed so as to abut the inclined surface 164 due to the base plate 92 rotating by a predetermined amount in the take-up direction relative to the rotating plate 140. When, from this state of abutment, the base plate 92 attempts to rotate even further in the take-up direction relative to the rotating plate 140, the inclined surface 164 is pushed in the pull-out direction by the pushing piece 154. Due to this pushing force, the pawl 130 rotates in the take-up direction around the boss 124.

At the take-up direction side end portion of each block 146 which runs along the peripheral direction of the rotating plate 140, a pushing portion 166 is formed, and a releasing piece accommodating portion 168 is formed further toward the axial center of the rotating plate 140 than the pushing portion 166. The pushing portion 166 is formed so as to correspond to the releasing piece 136 of the pawl 130 along the peripheral direction of the rotating plate 140.

The releasing piece 136 gradually curves toward the axial center of the base plate 92 from the portion thereof connected to the main body 132 (the proximal end portion thereof) toward the distal end side thereof. The transverse direction outer side surface of the releasing piece 136 as well is curved in a similar way. Accordingly, when the base plate 92 rotates by a predetermined amount in the pull-out direction relative to the rotating plate 140, the pushing portions 166 abut the transverse direction outer side surfaces of the releasing pieces 136. In this state of abutment, when the base plate 92 rotates further in the pull-out direction relative to the rotating plate 140, the pushing portions 166 push the distal end portions of the releasing pieces 136 in the take-up direction.

Here, the distal ends of the releasing pieces 136 are inclined surfaces which are inclined toward the outer side in the radial direction of the rotating plate 140, with respect to the pull-out direction. Thus, due to the pushing portions 166 pushing the distal ends of the releasing pieces 136, the pushing portions 166 rotate the pawls 130 in the pull-out direction around the bosses 124 and guide them to the releasing piece accommodating portions 168.

Moreover, the friction ring 170 is disposed coaxially between the cover 98 and the base portion 142 of the rotating plate 140. The friction ring 170 is formed in a ring shape on the whole. A pair of tongue-shaped attachment pieces 172 extend from the inner peripheral portion of the friction ring 170 so as to oppose one another across the center of the friction ring 170. The attachment pieces 172 are integrally connected to the base portion 142 of the rotating plate 140 by fasteners such as screws or the like. In this way, the rotating plate 140 and the friction ring 170 are integral.

The outer peripheral portion of the friction ring 170 corresponds to the distal end of the aforementioned braking piece 80. Due to the frame 64 rotating in the pull-out direction around the shaft 70, the distal end of the braking piece 80 slidingly contacts the outer peripheral portion of the friction ring 170.

The external gear 102 of the clutch 90 having the above-described structure meshes together with the gear 62.

OPERATION AND EFFECTS OF PRESENT EMBODIMENT

Next, the operation and effects of the present embodiment will be described by way of explaining the operation of the present webbing retractor 10.

(Basic Operation of Webbing Retractor 10)

First, the basic operation of the webbing retractor 10 will be described with reference to FIG. 5.

In the present webbing retractor 10, in the state in which the webbing belt 28 is taken-up and accommodated in the form of a roll on the spool 20, when the webbing belt 28 is pulled while an unillustrated tongue plate is pulled, the webbing belt 28 is pulled out while the spool 20 is rotated in the pull-out direction against the urging force of the spiral spring 34 which urges the spool 20 in the take-up direction. In this way, in the state in which the webbing belt 28 is pulled out, the vehicle occupant seated in a seat inserts the tongue plate in an unillustrated buckle device while pulling the webbing belt 28 around the front of his/her body, such that the tongue plate is held in the buckle device. The webbing belt 28 is thereby set in a state of being applied to the body of the vehicle occupant (hereinafter, this state will be referred to simply as the "applied state").

When the webbing belt 28 is pulled out and the spool 20 is rotated in the pull-out direction in order to apply the webbing belt 28 to the body of a vehicle occupant, the spiral spring 34 is wound tighter, such that the urging force of the spiral spring 34 which urges the spool 20 in the take-up direction increases. Accordingly, in the aforementioned applied state, the urging force of the spiral spring 34 works to make the webbing belt 28 be taken up on the spool 20. Thus, basically, the webbing belt 28 is fit to the body of the vehicle occupant due to this urging force, and the webbing belt 28 restrains and holds the body of the vehicle occupant by a force corresponding to the urging force at this time.

On the other hand, when holding of the tongue plate by the buckle device is released and the tongue plate comes out of the buckle device, the force for maintaining the webbing belt 28 in the state of being pulled-out against the urging force of the spiral spring 34 is cancelled. Thus, the spool 20 is rotated in the take-up direction by the urging force of the spiral spring 34. The webbing belt 28 which has been pulled out is taken-up in the form of a roll onto the outer peripheral portion of the spool 20 due to the rotation of the spool 20 in the take-up direction. In this way, the webbing belt 28 is accommodated.

Here, because the spool 20 is fit together with the adapter 112 of the clutch 90, when the spool 20 is rotated in order to pull-out or take-up the webbing belt 28, the adapter 112 rotates. However, in this state, if the adapter 112 merely rotates, the base plate 92 and the rotating plate 140 do not rotate. Therefore, the pawls 130 do not rotate, and accordingly, the external gear 102 does not rotate. Accordingly, the rotation of the spool 20 is not transmitted to the output shaft 50 of the motor 44 via the external gear 102 and the gears 62, 56.

(Operation of Webbing Retractor 10 when Approaching an Obstacle Ahead)

On the other hand, while the vehicle is traveling, the forward observation sensor 54 detects the distance to an obstacle which is in front of the vehicle. An electric signal having a signal level corresponding to the distance to the obstacle is outputted from the forward observation sensor 54. The electric signal outputted from the forward observation sensor 54 is inputted to the ECU 52 which serves as a control unit. At the ECU 52, on the basis of the electric signal from the forward observation sensor 54, it is judged whether or not the distance to the obstacle is less than a predetermined value.

Next, if it is judged at the ECU 52 that the distance to the obstacle is less than the predetermined value, the ECU 52 outputs a control signal to the driver 46, and makes current flow to the motor 44 via the driver 46. In this way, the motor 44 is driven to rotate forward at a speed of a predetermined value or more, and rotates the output shaft 50 forward. The rotation of the output shaft 50 is, while being decelerated via the gears 56, 62, transmitted to the external gear 102 of the clutch 90, and rotates the external gear 102 in the take-up direction at a rotational speed of a predetermined value or more.

The external gear 102 is mechanically connected to the base plate 92 via the torque limiters 104. Thus, due to the external gear 102 rotating in the take-up direction, the base plate 92 rotates integrally in the take-up direction.

When the base plate 92 rotates in the take-up direction, the abutment wall 152 pushes the take-up direction side end portion of the compression coil spring 150, and the compression coil spring 150 pushes the wall portion 148A of the spring accommodating portion 148 by urging force. The rotating plate 140 thereby attempts to rotate so as to follow rotation of the base plate 92.

On the other hand, as described above, when the rotation of the output shaft 50 is transmitted to the gear 62 via the gear 56, rotation is transmitted from the gear 62 to the gear 72, and the gear 72 attempts to rotate downward around the gear 62 while rotating around the shaft 74. However, the urging force of the tension coil spring 78 is applied to the frame 64 at which the shaft 74, which pivotally supports the gear 72, is supported. Thus, the gear 72 cannot rotate downward around the gear 62. (Namely, the state shown in FIG. 7A is maintained.)

However, as described above, the output shaft 50 rotates at a rotational speed of a predetermined value or more, and this rotation is transmitted to the gear 72. In this way, the resultant force of the force working on the gear 72, which is attempting to circle around the gear 62, and the gravity based on the self-weight of the gear 72 and the weight of the weight 76, exceeds the urging force of the tension coil spring 78. As shown in FIG. 7B, the gear 72, and consequently, the frame 64, are rotated around the shaft 70. In this way, the braking piece 80 slidingly contacts the outer peripheral portion of the friction ring 170. The friction, which is generated between the braking piece 80 and the outer peripheral portion of the friction ring 170, restricts rotation of the friction ring 170, and accordingly, of the rotating plate 140 which is integral with the friction ring 170.

In this way, relative rotation arises between the base plate 92 and the rotating plate 140, and the base plate 92 is rotated in the take-up direction with respect to the rotating plate 140.

In this way, when the base plate 92 rotates by a predetermined amount or more in the take-up direction relative to the rotating plate 140, the pushing pieces 154 provided at the blocks 146 of the rotating plate 140 abut the connecting pieces 134 of the pawls 130. In this state, when the base plate 92 attempts to rotate further in the take-up direction relative to the rotating plate 140, the pushing pieces 154 push the inclined surfaces 164 of the connecting pieces 134 in the pull-out direction.

The pushing forces applied to the inclined surfaces 164 act in the pull-out direction and toward the inner side in the radial direction of the rotating plate 140 and the base plate 92. The portions of the forces, which portions act toward the radial direction inner sides, rotate the pawls 130 in the take-up direction around the bosses 124. Due to the pawls 130 rotating in the take-up direction around the bosses 124, the corner portions of the distal ends 134A abut the outer peripheral portion of the adapter 112. In this state, the pawls 130 rotate together with the base plate 92 in the take-up direction around the center of the base plate 92, until at least one of the distal ends 134A abuts the external teeth 122 which are adjacent at the take-up direction sides (see FIG. 3).

Then, in this state, the distal ends 134A abut the external teeth 122. When the base plate 92 rotates further in the take-up direction, the distal ends 134A of the pawls 130 push the external teeth 122 in the take-up direction, and rotate the adapter 112, and accordingly, the spool 20, in the take-up direction. Due to this rotation of the spool 20, the webbing belt 28 is taken-up onto the spool 20.

In this way, looseness or so-called "slack" in the webbing belt 28 is eliminated, and the force by which the webbing belt 28 restrains the body of the vehicle occupant is improved. Even if the vehicle occupant thereafter carries out the operation of suddenly braking the vehicle such that a state of rapid deceleration of the vehicle arises, the webbing belt 28 reliably holds the body of the vehicle occupant.

Further, in this way, when the motor 44 stops in the state in which slack has been eliminated, rotation of the base plate 92 in the take-up direction stops. When rotation of the base plate 92 stops, the compression coil spring 150 pushes the rotating plate 140 in the take-up direction by urging force, and rotates the rotating plate 140 in the take-up direction.

When the rotating plate 140 rotates, the pushing portions 166 abut the releasing pieces 136 of the pawls 130 and push the releasing pieces 136 in the take-up direction. Due to the releasing pieces 136 receiving this pushing force, the pawls 130 rotate in the pull-out direction around the bosses 124, and the distal ends 134A of the connecting pieces 134 move away from the outer peripheral portion of the adapter 112. In this way, the mechanical connection between the base plate 92 and the adapter 112, i.e., the mechanical connection between the output shaft 50 of the motor 44 and the compression coil spring 150, is cancelled.

Here, in the present embodiment, as described above, the total number of the external teeth 122 of the adapter 112 is an odd number. In the state in which the distal end 134A of one of the pawls 130 is abutting the external tooth 122, the distal end 134A of the other pawl 130 is apart from the external tooth 122 along the peripheral direction of the adapter 112, and is positioned at an intermediate portion between the external tooth 122, which is adjacent in the take-up direction along the peripheral direction of the adapter 112, and the external tooth 122 which is adjacent in the pull-out direction. Namely, in the present embodiment, in the state in which the distal ends 134A of the both pawls 130 abut the outer peripheral portion of the adapter 112, the interval from the distal end 134A of one of the pawls 130 to the distal end 134A of the other of the pawls 130 is not an integer multiple of the pitch of the external teeth 122.

Thus, as shown in FIG. 4, even if the distal end 134A of one of the pawls 130 abuts the addendum of the external tooth 122 at the time when the both pawls 130 are rotating around the bosses 124, the distal end of the other of the pawls 130 does not abut the addendum of the external tooth 122, and abuts the outer peripheral portion of the adapter 112 between the external teeth 122 which are adjacent in the peripheral direction. Accordingly, even if the distal end 134A of one of the pawls 130 abut the addendum of the external tooth 122 and cannot mesh with the external tooth 122, the distal end 134A of the other of the pawls 130 reliably meshes with the external tooth 122 if the base plate 92 rotates by substantially one-half of the pitch of the external teeth 122. Thus, the rotation of the base plate 92 can reliably and quickly be transmitted to the adapter 112, and the torque of the motor 44 can be transmitted to the spool 20.

Moreover, in the state in which the distal end 134A of one of the pawls 130 abuts the addendum of the external tooth 122, the connecting piece 134 abuts the pushing piece 154 in this state as is. Here, even if the pushing piece 154 is integral with the rotating plate 140, further rotation of the base plate 92 in the take-up direction relative to the rotating plate 140 is restricted. In this state, because the interference of the pushing piece 154 with the distal end of the other of the pawls 130 is insufficient, the pushing piece 154 cannot rotate the other pawl 130 sufficiently in the take-up direction. As a result, there is the possibility that the distal end of the other of the pawls 130 cannot abut the external tooth 122.

Here, in the present embodiment, as described above, the connecting piece 134 abuts the pushing piece 154 with the distal end 134A of the one pawl 130 abutting the addendum of the external tooth 122. In this state, when the base plate 92 attempts to rotate further in the take-up direction relative to the rotating plate 140, the distal end 134A of the pawl 130 pushes the pushing piece 154 and displaces the pushing piece 154 in the take-up direction, against the urging force of the compression coil spring 158. In this way, the base plate 92 rotates in the take-up direction relative to the rotating plate 140.

Thus, the pushing piece 154 corresponding to the other pawl 130 interferes with the distal end 134A of the other pawl 130, and rotates the pawl 130 in the take-up direction. In this way, even if the connecting piece 134 abuts the pushing piece 154 in a state in which the distal end 134A of the one pawl 130 abuts the addendum of the external tooth 122, the other pawl 130 can be made to mesh with the external tooth 122 of the adapter 112, and the rotation of the base plate 92 can be reliably transmitted to the adapter 112.

On the other hand, as described above, by rotating the spool 20 in the take-up direction by the torque of the motor 44, the force by which the webbing belt 28 restrains the body of the vehicle occupant is improved. However, until the slack is eliminated, in the state in which the webbing belt 28 is wound on the spool 20, the body of the vehicle occupant is an obstruction, and the webbing belt 28 cannot be taken-up any further on the spool 20. In this state, if the spool 20 attempts to rotate further in the take-up direction and take-up the webbing belt 28, the webbing belt 28 is tightened against the body of the vehicle occupant by a force which is greater than needed, which is not preferable.

Here, as described above, if the spool 20 attempts to take-up the webbing belt 28 any more than needed, the body of the vehicle occupant is an obstruction to the taking-up of the webbing belt 28. Tensile force of a magnitude corresponding to the take-up force for the spool 20 to take the webbing belt 28 up is applied to the webbing belt 28 from the body of the vehicle occupant. This tensile force acts opposite to the direction in which the spool 20 takes up the webbing belt 28. Thus, the spool 20 is stopped due to this tensile force being applied to the webbing belt 28.

In this state, the torque of the motor 44 is applied to the spool 20 via the external gear 102, the base plate 92, the pawls 130 and the adapter 112. Thus, in the state in which the spool 20 is stopped, the external teeth 122 of the adapter 112 restrict rotation of the pawls 130 around the center of the base plate 92, and the pawls 130 restrict rotation of the base plate 92 in the take-up direction. Moreover, via the torque limiters 104, the base plate 92 restricts rotation of the external gear 102 in the take-up direction.

Here, in this state in which the rotation of the external gear 102 is limited by the base plate 92 via the torque limiters 104, if the external gear 102 attempts to rotate further in the take-up direction and the torque at this time exceeds the spring force of the torque limiters 104, the engaging portions 106 of the torque limiters 104 come out from the engaging recesses 100. In this way, the connection between the base plate 92 and the external gear 102 is temporarily cancelled, and only the external gear 102 rotates in the take-up direction until the engaging portions 106 enter into the other, adjacent engaging recesses 100.

In this way, due to the connection between the base plate 92 and the external gear 102 being cancelled, the transmission of the torque of the external gear 102 to the base plate 92, i.e., the transmission of the torque of the motor 44 to the spool 20, is cut-off. Thus, an increase in the restraining force applied by the webbing belt 28 can be suppressed.

In the present embodiment, because the total number of the external teeth 122 is an odd number, the distal ends 134A of the both pawls 130 do not simultaneously mesh with the external teeth 122. However, the present invention can be realized even if the total number of the external teeth 122 is an even number. Namely, it is possible to not dispose one of the pawls 130 at the exact opposite side of the circular hole 115 as the other of the pawls 130, and to dispose the one pawl 130 so as to be offset, around the circular hole 115, by an amount which is less than the pitch of the external teeth 122.

In the present embodiment, the ECU 52 drives the motor 44 via the driver 46 on the basis of the signal from the forward observation sensor 54 when the distance to an obstacle ahead is less than or equal to a given value. However, the condition for the distal end 134 of the pawl 130 to mesh with the external tooth 122 is not limited to the distance to an obstacle ahead. For example, a structure is possible in which the motor 44 is driven in a case in which a state of rapid deceleration of the vehicle is detected by an acceleration sensor.

As described above, in accordance with the present invention, even when any of the connecting members has abutted an addendum of the input gear, the other connecting member can be made to reliably mesh with the input gear. As a result, force can be transmitted reliably.

What is claimed is:

1. A webbing refractor for an elongated webbing belt used for application to a body of a vehicle occupant, the webbing retractor comprising:
    a take-up shaft for taking the webbing belt up around itself, the take-up shaft being rotatably held, and to which one end of the webbing belt is anchored;
    an input gear connected to the take-up shaft, a plurality of teeth being formed along a periphery of the input gear at uniform intervals at a given pitch;
    a prime mover rotating body receiving driving force from a drive source, and rotating; and
    a plurality of connecting members mounted at uniform angular distances around said input gear for transmitting rotation of the prime mover rotating body to the input gear, said plurality of connecting members rotating around the input gear interlockingly with the rotation of the prime mover rotating body, and each of which has a meshing portion that is capable of contacting and moving away from the input gear, and in a state in which at least one meshing portion contacts the input gear so as to engage with any of the teeth of the input gear, the rotation of the prime mover rotating body is transmitted to the input gear,
    wherein, in a state in which at least two of said uniformly angularly spaced connecting members contact the input gear, a distance, along a direction of rotation of the input gear, between two meshing portions of the at least two connecting members is not an integer multiple of said given pitch of the plurality of teeth such that one of said at least two connecting members meshes with one of said plurality of teeth, and
    further comprising a rotating disc body which is held so as to be coaxial with the prime mover rotating body and so as to be able to rotate relative to the prime mover rotating body, and the rotating disc body has a mechanism which, when the prime mover rotating body is driven and rotated at greater than a predetermined speed, rotates relative to the prime mover rotating body and rotates the plurality of connecting members in a direction of contacting the input gear.

2. The webbing retractor of claim 1, wherein, when the prime mover rotating body is driven and rotated at greater than a predetermined speed, the plurality of connecting members are moved such that the meshing portions contact the input gear.

3. The webbing refractor of claim 1, wherein the input gear has an odd number of teeth, and at least two of the meshing portions are disposed so as to be positioned so as to oppose one another across the input gear, at an outer side of the input gear.

4. The webbing retractor of claim 1, wherein the prime mover rotating body is pivotally supported so as to be coaxial with the input gear and so as to be able to rotate relative to the input gear.

5. The webbing refractor of claim 1, wherein the plurality of connecting members are held at the prime mover rotating body so as to be rotatable, and when the prime mover rotating body is driven and rotated at greater than a predetermined speed, the plurality of connecting members rotate in a direction of contacting the input gear.

6. The webbing refractor of claim 1, further comprising a braking mechanism, and when the prime mover rotating body is driven and rotated at greater than a predetermined speed, the braking mechanism brakes the rotating disc body and causes relative rotation of the rotating disc body.

7. The webbing retractor of claim 1, wherein the prime mover rotating body has an external gear which is ring-shaped, is connected to the drive source, and has external teeth for enabling the external gear to be rotated; a base portion which holds the plurality of connecting members, and which is pivotally supported so as to be coaxial with the input gear and so as to be able to rotate relative to the input gear; and at least one torque limiter which is provided between the external gear and the base portion, so as to be able to transmit torque of a predetermined range from the external gear to the base portion.

8. The webbing refractor of claim 1, further comprising a control unit controlling operation of the drive source, and when a rate of change in deceleration at a time when a vehicle decelerates is greater than or equal to a predetermined value, the control unit effects control so as to cause the drive source to operate.

9. The webbing retractor of claim 1, further comprising a control unit controlling operation of the drive source, and when a distance to an obstacle which is positioned ahead of a vehicle is less than a predetermined value, the control unit effects control so as to cause the drive source to operate.

10. A webbing retractor for an elongated webbing belt used for application to a body of a vehicle occupant, the webbing retractor comprising:
  a take-up shaft for taking the webbing belt up around itself, which take-up shaft is rotatably held, and to which one end of the webbing belt is anchored;
  an input gear connected to the take-up shaft, a plurality of teeth being formed along a periphery of the input gear at uniform intervals;
  a prime mover rotating body receiving driving force from a drive source, and rotating; and
  a plurality of connecting members mounted at uniform angular distances around said input gear for transmitting rotation of the prime mover rotating body to the input gear, said plurality of connecting members rotating around the input gear interlockingly with the rotation of the prime mover rotating body, and each of which has a meshing portion that is capable of contacting and moving away from the input gear, and in a state in which at least one meshing portion contacts the input gear so as to engage with any of the teeth of the input gear, the rotation of the prime mover rotating body is transmitted to the input gear,
  wherein said input gear has an odd number of teeth such that, when at least one of the meshing portions of a connecting member abuts a tooth of the input gear, the meshing portion of at least another one of the connecting members does not abut a tooth of the input gear so that at least one of said plurality of connecting members meshes with said teeth.

11. The webbing retractor of claim 10, wherein, when the prime mover rotating body is driven and rotated at greater than a predetermined speed, the plurality of commenting members are moved such that the meshing portions contact the input gear.

12. The webbing retractor of claim 10, wherein at least two of the meshing portions are disposed so as to be positioned so as to oppose one another across the input gear, at an outer side of the input gear.

13. The webbing retractor of claim 10, wherein the prime mover rotating body is pivotally supported so as to be coaxial with the input gear and so as to be able to rotate relative to the input gear.

14. The webbing retractor of claim 10, wherein the plurality of connecting members are held at the prime mover rotating body so as to be rotatable, and when the prime mover rotating body is driven and rotated at greater tan a predetermined speed, the plurality of connecting members rotate in a direction of contacting the input gear.

15. The webbing retractor of claim 10, further comprising a rotating disc body which is held so as to be coaxial with the prime mover rotating body and so as to be able to rotate relative to the prime mover rotating body, and the rotating disc body has a mechanism which, when the prime mover rotating body is driven and rotated at greater than a predetermined speed, rotates relative to the prime mover rotating body and rotates the plurality of connecting members in a direction of contacting the input gear.

16. The webbing retractor of claim 15, further comprising a braking mechanism, and when the prime mover rotating body is driven and rotated at greater than a predetermined speed, the braking mechanism brakes the rotating disc body and causes relative rotation of the rotating disc body.

17. The webbing refractor of claim 10, wherein the prime mover rotating body has an external sear which is ring-shaped, is connected to the drive source, and has external teeth for enabling the external gear to be rotated; a base portion which holds the plurality of connecting members, and which is pivotally supported so as to be coaxial with the input gear and so as to be able to rotate relative to the input gear; and at least one torque limiter which is provided between the external gear and the base portion, so as to be able to transmit torque of a predetermined range from the external gear to the base portion.

18. The webbing retractor of claim 10, further comprising a control unit controlling operation of the drive source, and when a rate of change in deceleration at a time when a vehicle decelerates is greater than or equal to a predetermined value, the control unit effects control so as to cause the drive source to operate.

19. The webbing retractor of claim 10, further comprising a control unit controlling operation of the drive source, and when a distance to an obstacle which is positioned ahead of a vehicle is less than a predetermined value, the control unit effects control so as to cause the drive source to operate.

20. A webbing retractor comprising:
  a take-up shaft, and a proximal end side of a webbing belt, which is elongated and strip-shaped and which is applied to a body of a vehicle occupant so as to restrain the body of the vehicle occupant, is anchored to the take-up shaft, and due to the take-up shaft rotating in a take-up direction which is one direction around an axis of the take-up shaft, the take-up shaft takes-up the webbing belt substantially in a form of a roll around an outer peripheral portion of the take-up shaft, and due to the webbing belt being pulled-out toward a distal end side of the webbing belt, the take-up shaft rotates in a pull-out direction which is opposite to the take-up direction;
  an input gear mechanically connected to the take-up shaft and rotating the take-up shaft by rotation of the input gear, an odd number of teeth being formed at uniform intervals at a given pitch around an axis of the input gear;
  a prime mover rotating body mechanically connected one of directly and indirectly to a drive source, and receiving driving force from the drive source and rotating;
  a plurality of connecting members mounted at uniform angular distances around said input gear which, interlockingly with rotation of the prime mover rotating body, rotate around the axis of the input gear, and the connecting members can move so as to approach and move away from the teeth of the input gear, and due to the connecting members moving so as to approach the teeth, the connecting members contact the input gear and transmit the rotation of the prime mover rotating body to the input gear, and in a state in which the connecting members are meshed with the input gear, a distance along a direction of rotation of the input gear between two meshing portions is not an integer multiple of said given pitch of the plurality of teeth such that at least one of said plurality of connecting members meshes with said teeth, a rotating disc body which is held so as to be coaxial with the prime mover rotating body and so as to be able to rotate relative to the prime mover rotating body, and the rotating disc body has a mechanism which, when the prime mover rotating body is driven and rotated at greater than a predetermined speed, rotates relative to the prime mover rotating body and rotates the plurality of connecting members in a direction of contacting the input gear.

21. The webbing refractor of claim 20, wherein the prime mover rotating body has a substantially ring-shaped external gear which is pivotally supported at the take-up shaft so as to be coaxial with the take-up shaft and so as to be able to rotate relative to the take-up shaft, and a plurality of external teeth are formed at an outer peripheral portion of the external gear at uniform intervals, and the external gear is connected one of directly and indirectly to a drive gear which rotates by driving force of the drive source, and the input gear has a shaft portion which is provided at an inner side of the external gear, and which is connected coaxially and integrally with the take-up shaft, and the teeth are formed at an outer peripheral portion of the shaft portion at predetermined intervals, and the external gear supports the connecting members such that the connecting members can move so as to approach and move away from the input gear, between the external gear and the input gear along a radial direction of the external gear.

22. The webbing retractor of claim 20, wherein the connecting members move so as to approach the input gear and mesh with the input gear in a case in which the prime mover rotating body rotates in a direction of rotating the take-up shaft in the take-up direction in a state in which the connecting members mesh with the input gear.

* * * * *